(12) United States Patent
Weber, Jr.

(10) Patent No.: US 12,432,601 B2
(45) Date of Patent: Sep. 30, 2025

(54) NETWORK HEALTH CHECK MONITORING

(71) Applicant: DISH WIRELESS L.L.C., Englewood, CO (US)

(72) Inventor: Kenneth William Weber, Jr., Littleton, CO (US)

(73) Assignee: DISH Wireless L.L.C., Englewood, CO (US)

( * ) Notice: Subject to any disclaimer, the term of this patent is extended or adjusted under 35 U.S.C. 154(b) by 378 days.

(21) Appl. No.: 18/190,835

(22) Filed: Mar. 27, 2023

(65) Prior Publication Data
US 2024/0334224 A1 Oct. 3, 2024

(51) Int. Cl.
*H04W 24/10* (2009.01)
*H04W 24/04* (2009.01)
*H04W 24/08* (2009.01)

(52) U.S. Cl.
CPC ......... *H04W 24/10* (2013.01); *H04W 24/04* (2013.01); *H04W 24/08* (2013.01)

(58) Field of Classification Search
CPC ...... H04W 24/04; H04W 24/08; H04W 24/10
See application file for complete search history.

(56) References Cited

U.S. PATENT DOCUMENTS

| | | | | |
|---|---|---|---|---|
| 6,157,619 A | * | 12/2000 | Ozluturk | H04W 88/181 370/335 |
| 2004/0058652 A1 | * | 3/2004 | McGregor | H04B 17/24 455/423 |
| 2005/0120208 A1 | * | 6/2005 | Albert Dobson | H04L 43/00 713/160 |
| 2011/0188403 A1 | * | 8/2011 | Calippe | H04W 24/08 370/254 |
| 2016/0381699 A1 | * | 12/2016 | Rubin | H04L 1/00 370/329 |
| 2017/0127301 A1 | * | 5/2017 | Sharma | H04L 41/28 |
| 2019/0190834 A1 | * | 6/2019 | Sung | H04L 43/0858 |
| 2022/0167262 A1 | * | 5/2022 | Ding | H04L 67/56 |

* cited by examiner

*Primary Examiner* — Syed Ali
(74) *Attorney, Agent, or Firm* — Kipman T. Werking; Frontier IP Law PLLC

(57) ABSTRACT

A disclosed method may include (i) generating, at a first time, a first bitmap where each bit of the first bitmap indicates a pass or fail for a respective health check test in a series of health check tests testing a cellular service network, (ii) generating, at a second time, a second bitmap where each bit of the second bitmap indicates a pass or fail for a corresponding respective health check test in the same series of health check tests testing the cellular service network, and (iii) remediating a network problem indicated by detecting that a first result of a data integrity function executed on the first bitmap does not match a second result of the same data integrity function executed on the second bitmap.

16 Claims, 8 Drawing Sheets

400

N3 Gateway (from all UPFD'S towards gNB's)

Summary Data: (402)

| UPFD Location | Test Type | PassCount | FailCount | TotalCount | PassRate |
|---|---|---|---|---|---|
| Denver | Ping | 5 | 0 | 5 | 100% |
| Las Vegas | Ping | 23 | 1 | 24 | 95% |
| Portland | Ping | 3 | 0 | 3 | 100% |
| Phoenix | Ping | 16 | 0 | 16 | 100% |
| Seattle | Ping | 4 | 0 | 4 | 100% |
| San Jose | Ping | 15 | 0 | 15 | 100% |
| Chicago | Ping | 6 | 0 | 6 | 100% |
| Columbus | Ping | 114 | 0 | 114 | 100% |
| Minneapolis | Ping | 10 | 0 | 10 | 100% |
| Houston | Ping | 98 | 0 | 98 | 100% |
| Kansas City | Ping | 49 | 0 | 49 | 100% |
| Dallas | Ping | 100 | 0 | 100 | 100% |
| Atlanta | Ping | 129 | 0 | 129 | 100% |
| Boston | Ping | 13 | 0 | 13 | 100% |
| Philadelphia | Ping | 17 | 0 | 17 | 100% |
| New York | Ping | 18 | 1 | 19 | 94% |
| Miami | Ping | 42 | 2 | 44 | 95% |
| Washington DC | Ping | 86 | 0 | 86 | 100% |

Issue Detail: (452)

| UPFD Location | Test Type | Source IP | Target IP | Result |
|---|---|---|---|---|
| Las Vegas | Ping | 9.255.61.82 | 9.223.18.203 | Fail |
| New York | Ping | 9.255.61.218 | 9.231.122.31 | Fail |
| Miami | Ping | 9.255.70.90 | 9.231.82.227 | Fail |
| Miami | Ping | 9.255.70.90 | 9.231.82.229 | Fail |

*FIG. 4*

```
500
                                              560
                        ┌─────────────────────────────────────────────────────────────────────┐
502 ──┤  ********************      C3 PCF - EXPECTED INSTANCE COUNT = 3    ********************
504 ──┤  ►PCF  ⌐REGISTERED⌐    c1c8479c-074c-11ec-9a03-0242ac130003  544    ⌐w2⌐◄     w2.az1.ndc
506 ──┤  ►PCF  ⌐REGISTERED⌐    253b3b8e-7982-11ec-90d6-0242ac120003        ►⌐e2⌐ 542  e2.az1.ndc
508 ──┤  ********************  560   PCF - ACTUAL INSTANCE COUNT = 2       ********************
                              560                                        562
510 ──┤  ********************      C3 BSF - EXPECTED INSTANCE COUNT = 3    ********************
512 ──┤  ►BSF  ⌐REGISTERED⌐    42b63f90-79fc-11ec-90d6-0242ac120003  548    ⌐e2⌐◄     e2.az1.ndc
514 ──┤  ►BSF  ⌐REGISTERED⌐    240dff52-1a06-11ec-9621-0242ac130002        ►⌐w2⌐ 546  w2.az1.ndc
516 ──┤  ********************  560   BSF - ACTUAL INSTANCE COUNT = 2       ********************
                              560                                        562
518 ──┤  ********************      C2 CHF - EXPECTED INSTANCE COUNT = 3    ********************
520 ──┤  ►CHF  ⌐REGISTERED⌐    52b2a830-86e3-45bd-a990-de6f3751a5b5  552    ⌐e2⌐◄     e2.az1.ndc
522 ──┤  ►CHF  ⌐REGISTERED⌐    52b2a830-86e3-45bd-a990-de6f3751a5b4        ►⌐w2⌐ 550  w2.az1.ndc
524 ──┤  ********************  560   CHF - ACTUAL INSTANCE COUNT = 2       ********************
                              560                                        562
526 ──┤  ********************      C4 SEPP - EXPECTED INSTANCE COUNT = 3   ********************
528 ──┤  ►SEPP ⌐REGISTERED⌐    76f7b70a-7adf-11ec-90d6-0242ac120003  556    ⌐w2⌐◄     w2.az1.ndc
530 ──┤  ►SEPP ⌐REGISTERED⌐    2def4c86-899d-11ec-a8a3-0242ac120002        ►⌐e2⌐ 554  e2.az1.ndc
532 ──┤  ********************  560   SEPP - ACTUAL INSTANCE COUNT = 2      ********************
                              560                                        562
534 ──┤  ********************      C3 5G_EIR - EXPECTED INSTANCE COUNT = 0 ********************
536 ──┤  ►5G_EIR ⌐REGISTERED⌐  26740920-e2be-42ae-aade-71a76214d33C  560    ⌐e2⌐◄     e2.az2.ndc
538 ──┤  ►5G_EIR ⌐REGISTERED⌐  26740920-d2be-42ae-aade-71a76214d33c         ⌐w2⌐ 558
540 ──┤  ********************  560   5G_EIR - ACTUAL INSTANCE COUNT = 2    ********************
                                                                         562
                        └─────────────────────────────────────────────────────────────────────┘
```

*FIG. 5*

```
                usw2aza001np-ns-or-nrf-001 NF Issues:
        Following NFS and/or NF Services not REGISTERED with NRF-usw2azal NF Status:
        NF-TYPE         NF-STATUS           NF-INSTANCE 612 →   ****************************       C1 UDR - EXPECTED INSTANCE COUNT = 39
614 →   UDR             SUSPENDED           ebe2053-749b-5916-9078-0cb296d8c363
616 →   UDR     654     SUSPENDED           cb44d8c0-da90-5ab4-a19b-6fe18ffc8eb7
618 →   UDR     654     SUSPENDED           c513be18-d510-51c2-b1e2-2b7e29b9bfa2
620 →   UDR     654     SUSPENDED           c2b1ae98-c256-5fb3-be1b-7f488575a8c5
622 →   UDR     654     SUSPENDED           99b830dc-df5c-55fd-a5ae-d71798692ebd
624 →   UDR     654     SUSPENDED           90c6e7b7-a4e9-5c00-b706-364f0a08a606
626 →   UDR     654     SUSPENDED           7b4ee735-1cf1-5c85-8607-f4863ae728e3
628 →   UDR     654     SUSPENDED           3e85cffb-5576-5cec-af2a-3c9bd13a87b8
630 →   UDR     654     SUSPENDED           37bc224e-da83-5caf-ab84-6780bed4ac1b
632 →   UDR     654     SUSPENDED           2fd84757-9350-50ec-bae0-40b81a5f7d33
634 →   UDR     654     SUSPENDED           1cec92bd-35cd-52b3-b95d-f3efac09dea0
636 →   UDR     654     SUSPENDED           14226d34-37c6-5570-9142-bfd840685c0f
638 →   UDR     654     SUSPENDED           0ca9dd4a-89b3-53a7-bc16-60baa42b567a
640 →   ****************************        UDR - ACTUAL INSTANCE COUNT = 13    ***
                        654                                              658

642 →   ****************************       C2 CHF - EXPECTED INSTANCE COUNT = 3
644 →   CHF             SUSPENDED           52b2a830-86e3-45bd-a990-de6f3751a5b6
        ****************************       CHF - ACTUAL INSTANCE COUNT = 1     ***
                        654                                              660

656   C3 NSSF - EXPECTED INSTANCE COUNT = 3
646 →   ****************************
648 →   NSSF            REGISTERED          cf1b3a92-794f-11ec-90d6-0242ac120003   662
650 →   NSSF            SUSPENDED           43d34cd4-836a-11ec-a8a3-0242ac120002
652 →   ****************************       NSSF - ACTUAL INSTANCE COUNT = 2     ***
                        654                                              664
```

| NAME | -4 | -3 | -2 | -1 | 0 |
|---|---|---|---|---|---|
| N2 | 100% FF | 100% FF | 75% FC | 75% FC | 63% F8 |
| N3 | 100% FFF | 100% FFF | 92% EFF | 92% FEF | 92% FFE |
| ... | | | | | |
| S84 | 92% FFE | 92% FFE | 92% FFE | 92% FFE | 92% FFE |
| N4 | 100% FF | 100% FF | 100% FF | 100% FF | 100% FF |

HC MONITOR

710 → NAME row
712 → N2 row
714 → N3 row
716 → S84 row
718 → N4 row 720, 722, 724, 726, 728, 730

*FIG. 7*

NETWORK HEALTH CHECK MONITORING

BRIEF SUMMARY

This application is generally directed to network health check monitoring, as discussed further below. In one example, a method may include (i) generating, at a first time, a first bitmap where each bit of the first bitmap indicates a pass or fail for a respective health check test in a series of health check tests testing a cellular service network, (ii) generating, at a second time, a second bitmap where each bit of the second bitmap indicates a pass or fail for a corresponding respective health check test in the same series of health check tests testing the cellular service network, and (iii) remediating a network problem indicated by detecting that a first result of a data integrity function executed on the first bitmap does not match a second result of the same data integrity function executed on the second bitmap.

In some examples, the cellular service network comprises a cellular service core network.

In some examples, at least one of the series of health check tests indicates whether a number of detected components matches a number of expected components.

In some examples, output from the series of health check tests is recorded within a data lake.

In some examples, the first bitmap indicates a higher pass rate than the second bitmap.

In some examples, the data integrity function indicates that a bit of at least one health check test has altered despite the first bitmap and the second bitmap indicating a same pass rate.

In some examples, at least one of the series of health check tests indicates whether a system component is registered.

In some examples, at least one of the series of health check tests indicates whether a detected location of a component matches an expected location of the component.

In some examples, at least one of the series of health check tests produces predominantly numerical output.

In some examples, at least one of the series of health check tests produces predominantly alphanumerical output.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings:

FIG. 4 shows a diagram of example results from respective health check tests organized according to geographic hubs.

FIG. 5 shows a diagram of example results in alphanumeric characters for performing respective health check tests.

FIG. 6 shows another diagram of example results in alphanumeric characters for performing respective health check tests.

FIG. 7 shows a diagram of bitmap results corresponding to respective health check tests progressing chronologically in time.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
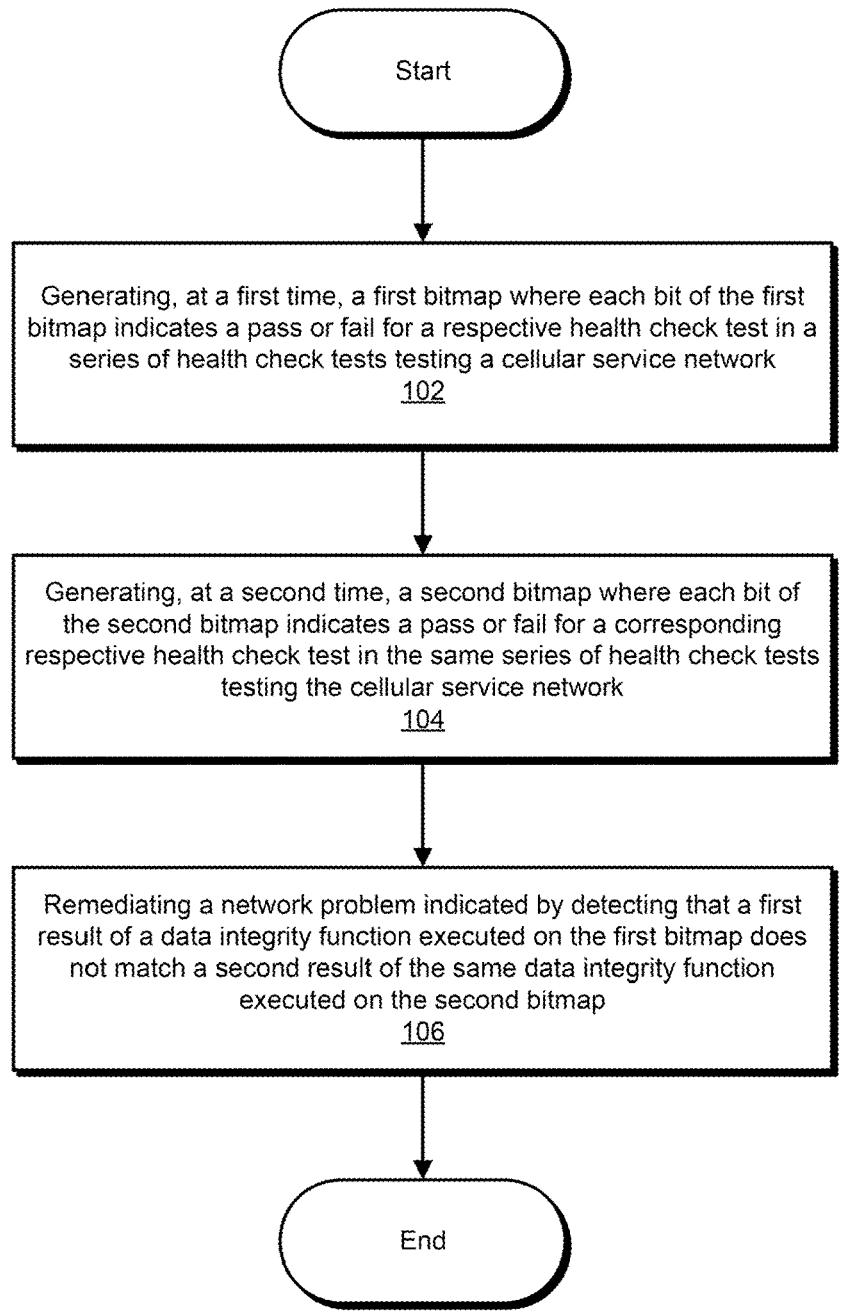
FIG. 1 shows a flow diagram for an example method for network health check monitoring.

FIG. 1 shows a flow diagram for an example method 100 for performing network health check monitoring. At step 102, one or more of the systems described herein may generate, at a first time, a first bitmap where each bit of the first bitmap indicates a pass or fail for a respective health check test in a series of health check tests testing a cellular service network. At step 104, one or more of the systems herein may generate, at a second time, a second bitmap where each bit of the second bitmap indicates a pass or fail for a corresponding respective health check test in the same series of health check tests testing the cellular service network. Lastly, at step 106, one or more of the systems described herein may remediate a network problem indicated by detecting that a first result of a data integrity function executed on the first bitmap does not match a second result of the same data integrity function executed on the second bitmap. Further details regarding method 100, as well as additional details and various different embodiments, will be described in more detail below in connection with FIGS. 2-7.

Figure 2:
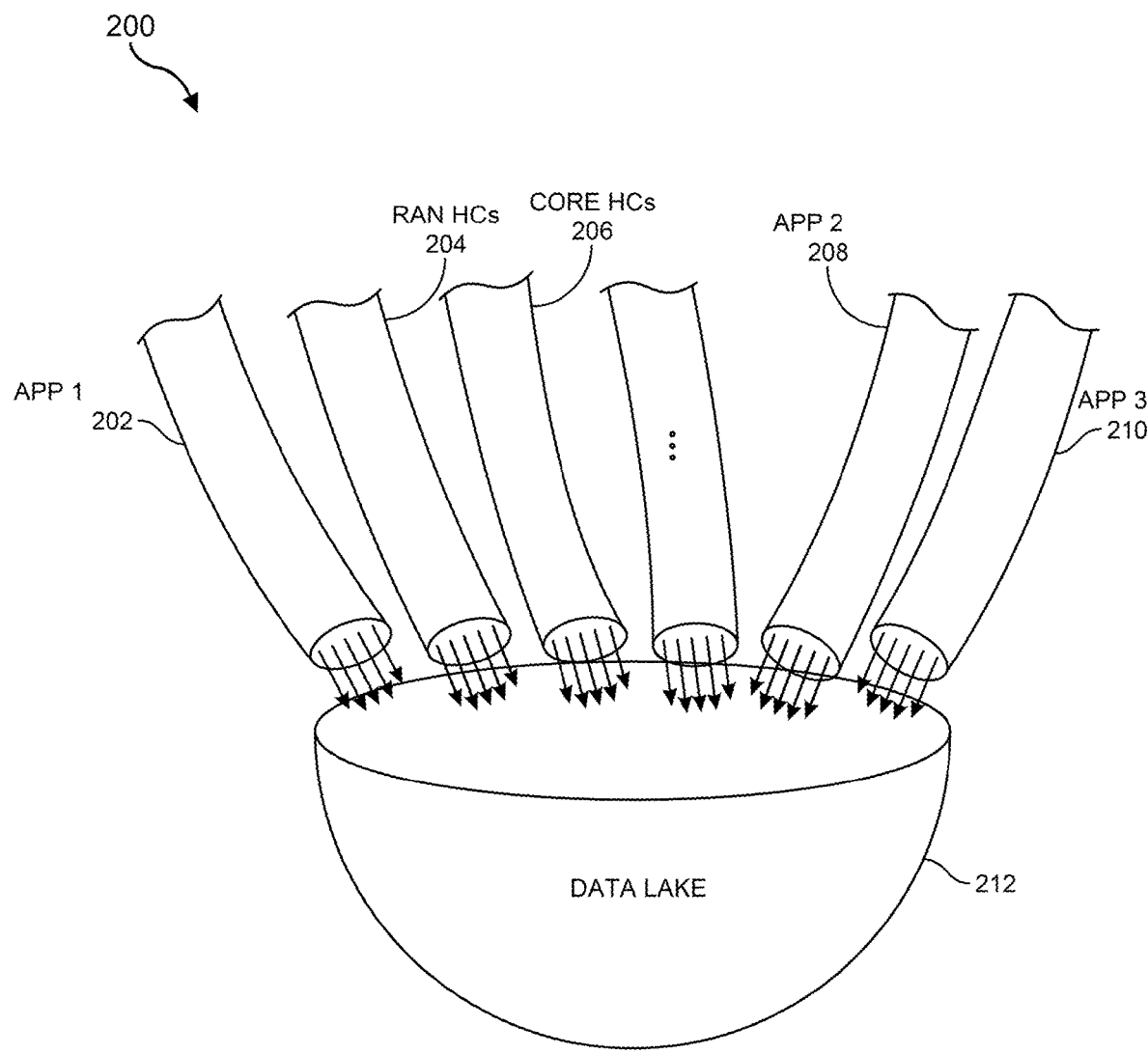
FIG. 2 shows a diagram of example data input sources into a data lake.

FIG. 2 shows a diagram 200 of example input sources 202-210 into a data lake 212. Input source 202 corresponds to a first application ("APP 1"), input source 208 corresponds to a second application ("APP 2"), and input source 210 corresponds to a third application ("APP 3"). In contrast, input source 204 and input source 206 correspond to radio access network health checks and core health checks, respectively. These network health checks may be performed with respect to a radio access network and/or a cellular core network provided by a 5G or other cellular service network provider. Although one or more of the examples described herein may involve the results of performing health checks with respect to input source 206, those having skill in the art will understand that the same methods and/or embodiments may be effectively applied to one or more of the remaining input sources shown within this figure, in a parallel manner, as discussed in more detail below.

By way of background, a radio access network, or RAN, is a key component of modern telecommunications infrastructure. It is responsible for providing wireless connectivity between user devices, such as smartphones or tablets, and the core network that enables communication with other devices or services. The RAN typically consists of a series of base stations or cell towers that are strategically placed to provide coverage over a designated geographic area, also known as a cell. Each cell is assigned a unique identifier, which is used to track and manage connections between user devices and the network. The RAN is designed to enable seamless handover of user connections between cells as they move, ensuring uninterrupted connectivity and reliable performance.

One of the primary functions of the RAN is to manage radio resources, such as frequency bands, to ensure efficient use and optimal performance. This is achieved through a process called radio resource management, which involves monitoring network traffic and dynamically allocating resources to meet changing demands. The RAN also performs functions such as signal amplification and modulation, which can be important for transmitting data over long distances and through obstacles. The RAN is designed to support multiple wireless technologies, such as 2G, 3G, 4G, and 5G, each of which provides different levels of performance and capability.

The RAN is generally a complex and dynamic system and can involve careful planning and management to ensure optimal performance and reliability. Operators can balance factors such as coverage, capacity, and cost to design and deploy RAN infrastructure that meets the requests or needs of their users. Ongoing maintenance and optimization of the RAN can also be important to ensure that the network continues to perform at its best. As the demand for wireless connectivity continues to grow, the RAN will remain a key component of telecommunications infrastructure, enabling people and devices to stay connected.

In contrast, a cellular core network is the central part of a cellular network that manages communication between various mobile devices. The cellular core network acts as a control center for voice and data communications that take place within a cellular network. This network is responsible for handling signaling and authentication processes for the mobile devices to access the network, and it provides a variety of services to mobile users, such as voice calling, messaging, and internet access.

In short, the cellular core network and the radio access network are two distinct parts of a cellular network that work together to provide mobile services to subscribers. The cellular core network manages the communication between mobile devices and provides a range of services to subscribers, while the radio access network provides the wireless connectivity for mobile devices to access the cellular network. The two networks are interconnected and work together to provide seamless connectivity and high-quality mobile services to subscribers.

Figure 3:
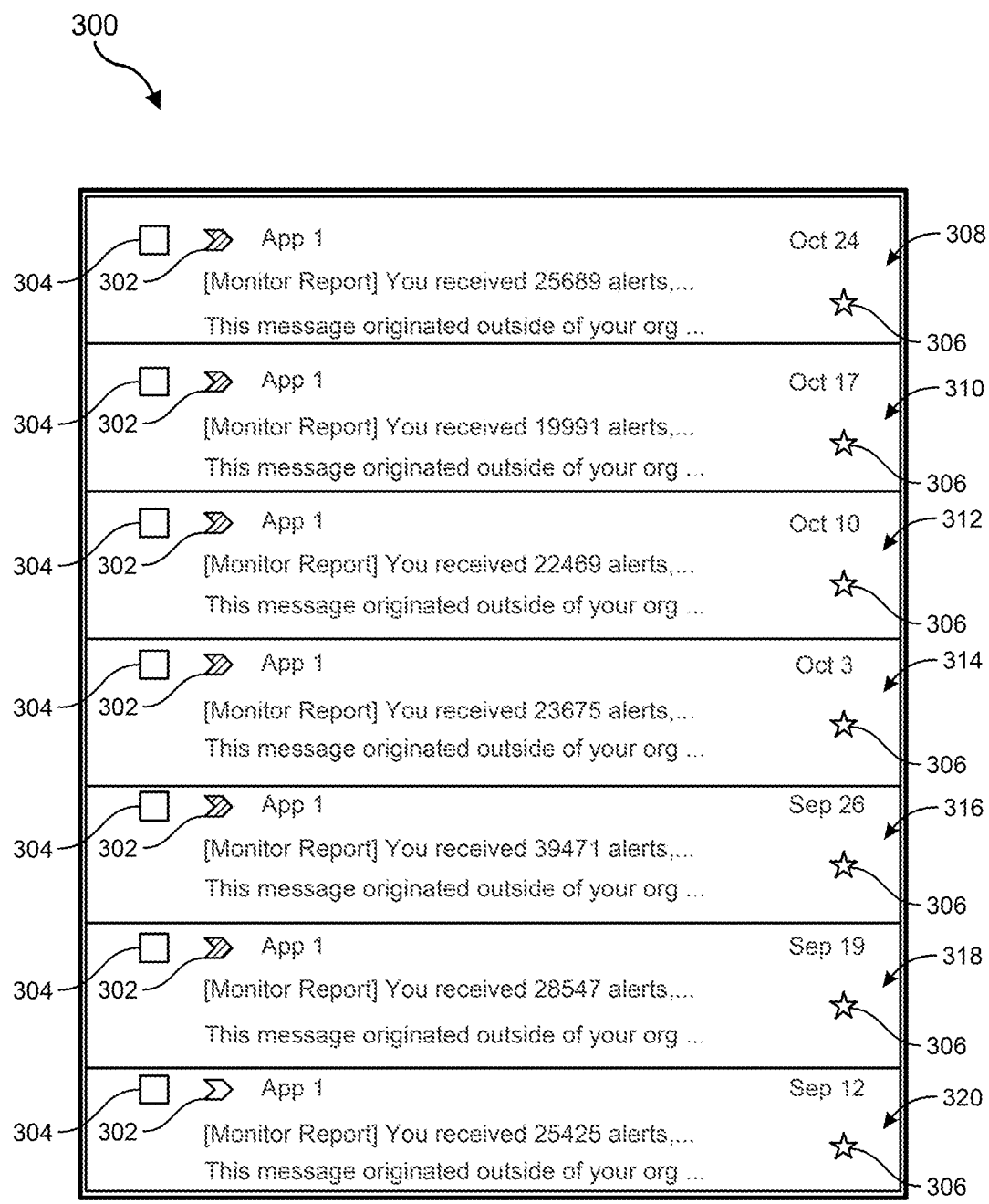
FIG. 3 shows a diagram of example application reports being notified by email into an administrator's email inbox.

FIG. 3 shows a diagram 300 as part of a graphical user interface for an administrator's email. This figure helps illustrate the massive amount of information that might be recorded, or ingested, into data lake 212. Diagram 300 includes emails 308-320, which together further include respective instances of selection icon 304, priority icon 302, and star icon 306, for example. As further illustrated in this figure, all of these different emails correspond to just one of the different input sources 202-210, which are further discussed above in the context of FIG. 2, and which are ingested into data lake 212. In particular, all of these various emails correspond to just the single application, "APP 1," which further corresponds to input source 202. Moreover, each one of these respective emails shown within FIG. 2 simply notifies the network administrator that the administrator has received a massive number of corresponding "alerts." As one illustrative example, email 308 further indicates to the administrator that the administrator has received "25689 alerts," which is a massive number of alerts. Similarly, email 310 indicates to the administrator that the administrator has received "19991" alerts, which again is a massive number of alerts to receive. This figure further illustrates how, for the administrator, the alert system has been configured to report these alerts by email on a weekly basis. Nevertheless, those having skill in the art can readily ascertain that, in other configurations, the emails might be reported at a different interval or schedule.

FIG. 4 shows an example diagram 400 of data output that is very numeric in nature, as distinct from data that is predominantly alphanumeric (see FIG. 5). Diagram 400 also corresponds to data resulting from the core network health checks of input source 206, as further discussed above (see FIG. 2). As further shown in this figure, the top table within diagram 400 may include columns 402, 406, 408, 410, 412, and 414 as well as rows 404 and 416-450. Similarly, the bottom table within diagram 400 may include columns 452-460, as well as rows 462-470.

FIG. 4 helps to illustrate examples of network health checks that can be performed to test the health of a cellular core network. As one illustrative example, at row 418 for Las Vegas, five different instances of a particular type of test have been performed, as indicated by row 412 which indicates a total count of tests. Row 406 indicates the type of the test, which is "Ping" for all the tests shown within this figure. Those having skill in the art can readily ascertain that, in other examples or embodiments, a different type of test may be performed consistent with method 100. At row 418, this figure also highlights how, among the 24 different instances of tests that were performed with respect to Las Vegas, 23 of these tests passed, whereas one of these tests failed. This further indicates a 95% pass rate, as shown in column 414. In contrast, at row 420 for Portland, a total count of three tests were performed, as indicated by column 412, and all three of these tests passed, as indicated by column 408, where zero instances of this test failed, is indicated by column 410. Accordingly, the overall pass rate was 100%, as further indicated at column 414. The remainder of the tables shown within the top table of diagram 400 proceed in a parallel manner.

As used herein, the term "health check" or "health check test" can refer to different levels of testing within a testing hierarchy. For example, all five of the testing procedures performed as part of the total count of five testing procedures at column 412 of row 416 may individually correspond to a respective health check test. Additionally, or alternatively, the entirety of these five tests may correspond to a singular "health check test." For example, in various embodiments, a pass rate of 95% may indicate a pass for the entire row corresponding to a singular health check, whereas a pass rate of 50% may indicate a fail for the entire row corresponding to a single or health check. Additionally, or alternatively, in even further examples, the entirety of diagram 400 may correspond to a singular health check that may be assessed in a manner parallel to the discussion of individual rows, as further outlined above. Any one or more of these examples along a testing hierarchy may result in a pass or fail bit that may be adjusted within a corresponding health check bitmap, as further discussed below in connection with method 100 and FIG. 7, for example.

For completeness, the bottom table within diagram 400 indicates additional health check tests that can be performed. These respective tests correspond to pinging tests between a source Internet protocol address, as indicated by column 456, and a target Internet protocol address, as indicated by column 458. As further shown in this figure, all four of these different respective health check tests resulted in failure in this particular example, which is used for illustrative purposes only.

FIG. 5 shows another diagram 500 illustrating the results of respective health check tests, in which case the results of these health check tests or predominantly alphanumeric character, as distinct from the predominantly numerical output discussed above in connection with FIG. 4. As further shown in this figure, diagram 500 may include a series of rows 502-540.

The example of diagram 500 helps to illustrate a variety of qualitatively different types of health check tests. As one example, a health check test can assess whether a particular machine, software instance, and/or system component is registered. In the example of diagram 500, all of the corresponding registration tests have resulted in a positive result, as indicated by the 10 different instances of a registered icon 560.

Similarly, another example of a type of a health test check can correspond to checking whether a total count of expected instances or components matches an actual or detected count of instances or components. For example, rows 502, 510, 518, 526, and 534, indicate an expected instance count of three, three, three, three, and zero, respectively. Nevertheless, the actual detected instance count is two for each of these respective tests, as indicated by the five separate instances of indicator 562.

Additionally, another qualitatively different example type of a health check may correspond to detecting whether an instance or component is actually located at the particular location where it is expected to be located. For example, for rows 504, 506, 512, 514, 520, 522, 528, 530, and 536, the detected location on the right-hand side of either west (e.g., "w2.az1.ndc") or east (e.g., "e2.az1.ndc") actually matches the same location that was detected by the corresponding health check test on the left-hand side at indicators 542-558. For example, on row 504, the detected location of west ("w2") matches the expected location of "w2.az1.ndc". In contrast, at row 538, the detected location of west ("w2") does not match the expected location, which is empty in this example, which is used for illustrative purposes only.

FIG. 6 shows another diagram 600 illustrating a further example of health check tests producing results in predominantly alphanumeric characters, as distinct from the predominantly numerical output discussed above in connection with FIG. 4. As further shown in this figure, diagram 600 may further include rows 612-652. Each of these respective rows may correspond to a health check test for particular software instance or component, for example. Each instance or component may be identified by an identifier, such as a globally unique identifier, such as those shown on the right-hand side of diagram 600. For example, the identifier corresponding to row 614 is "ebe2053-749b-5916-9078-0cb296d8c363".

Similar to FIG. 5, FIG. 6 illustrates the usage of various qualitatively different types of health check tests. For example, as in FIG. 5, the configuration of FIG. 6 includes tests that check whether expected count of instances or components matches an actual or detected count of such instances or components. As one particular example, row 612 indicates an expected instance count of 39, which does not match the actual instance count of 13, as indicated at indicator 658. Similarly, different instances of a performing a registration test have been performed corresponding to rows 614-638, 644, 648, and 650. As further shown in this figure, all of these respective performances of the registration test have resulted in an output of "suspended," which means non-functional, except for row 648, which indicates a result of "registered."

FIG. 7 shows a simplified diagram 700 that helps to illustrate the capturing of different health check test bitmaps at various points of time, progressing chronologically as indicated by header 702. This figure also further helps to illustrate the usage of a data integrity function, such as a checksum or hash, to verify whether the bitmap can change from one point in time to another point in time. Diagram 700 includes row 710-718, where rows 712-718 indicate the progression of results from respective health check tests over time. Row 710 indicates headers for corresponding columns.

For example, column 720 identifies the "name" of a corresponding health check test and/or series of health checks, where each health check corresponds to a bit of the bitmap for that row) The remaining columns 722-730 indicate the results of performing the respective series of health check tests for that row. The results in each cell of the table of diagram 700 include a pair of two separate values, where the first value is the overall pass rate for the bitmap and the second value indicates the bitmap itself as a hexadecimal string. Moreover, at row 710, column 722-730 correspond to different points in time, reaching back chronologically from the present time corresponding to zero. Accordingly, row 728 corresponds to one unit backwards in time, column 726 corresponds to two units backwards in time, and so on.

As further shown in this figure, the values in the bitmap for a specific health check test, which corresponds to each respective row, can deteriorate at least two different fashions. By way of example, row 712 corresponds to a health check test that is deteriorating in a more conspicuous manner such that the passage rate itself is decreasing over time. For example, the pass rate decreases from 100% a column 724 to 75% at column 726, and then again subsequently decreases to 63% at column 730. Accordingly, a problem in the corresponding portion of the cellular core network (or any other suitable network) can be readily identified by detecting the diminution in the passage rate for this particular health check test.

In contrast, the passage rate for the health check tests corresponding to row 714 stays the same from column 726 to column 728 to column 730. Nevertheless, although the passage rate for the bitmap remains the same, at 92%, the values of the bitmap still indicate a problem that may require or suggest remediation or other administrator intervention, as further discussed below. In particular, the fact that the passage rate remains the same at 92% effectively disguises, or obscures, the fact that the bitmap itself is changing over time, which further indicates that there is variation in terms of which particular health check tests are passing and failing. From one unit of time to the next, although the total number of health check tests that are passing remains the same, at 92%, the particular health checks that are passing to achieve this passage rate is changing.

To be specific, the value for this row at column 726 is EFF, which is binary 111011111111. In contrast, the value for this row or column 728 is FEF, which is binary 111111101111. And the value for this row at column 730 is FFE, which is binary 111111111110. In all three instances of the results for this row at column 726, column 728, and column 730, there is only a single test in the series that is failing, which correspond to the zero in each of the binary numbers listed above. Nevertheless, the particular location of this zero is shifting, or otherwise moving, in between different units of time.

In view of the above, a network administrator and/or system monitor can detect an indicated problem with the network at least in part by detecting a change in the corresponding bitmap for row from one unit of time to the next unit time. Nevertheless, these bitmaps might, in some cases, have massive sizes such that comparing two bitmaps, bit by bit, directly may become computationally inefficient and/or unattractive. This is due, in part, to the massive sizes of input data illustrated and discussed above in connection with FIGS. 2-3. To address these challenges, network administrator and/or system monitor can detect the change in the bitmap by executing a data integrity function, such as a checksum or hash, on two different instances of the bitmap at two different instances of time, and then check whether the results of these two executions of the data integrity function match each other. As understood by those having skill in the art, a data integrity function can be performed on an item of data at one point of time and also further performed at a second, subsequent point in time, where the integrity of the data is indicated by the results of these operations matching. In the case of a checksum operation, an item of data can be divided by a checksum divisor, and the results of the checksum operation corresponds to the remainder that is left after dividing the item of data to the checksum divisor. Generally speaking, even a small change in the data, such as the change in the bitmap at row 714 from column 726 to column 730, will result in a change in the checksum remainder, which is the output value. Accordingly, using the checksum operation and/or any other suitable data integrity operation, the network administrator and/or system monitor can detect changes in the bitmap, which further indicate a potential problem that could be remediated or otherwise addressed.

Figure 8:
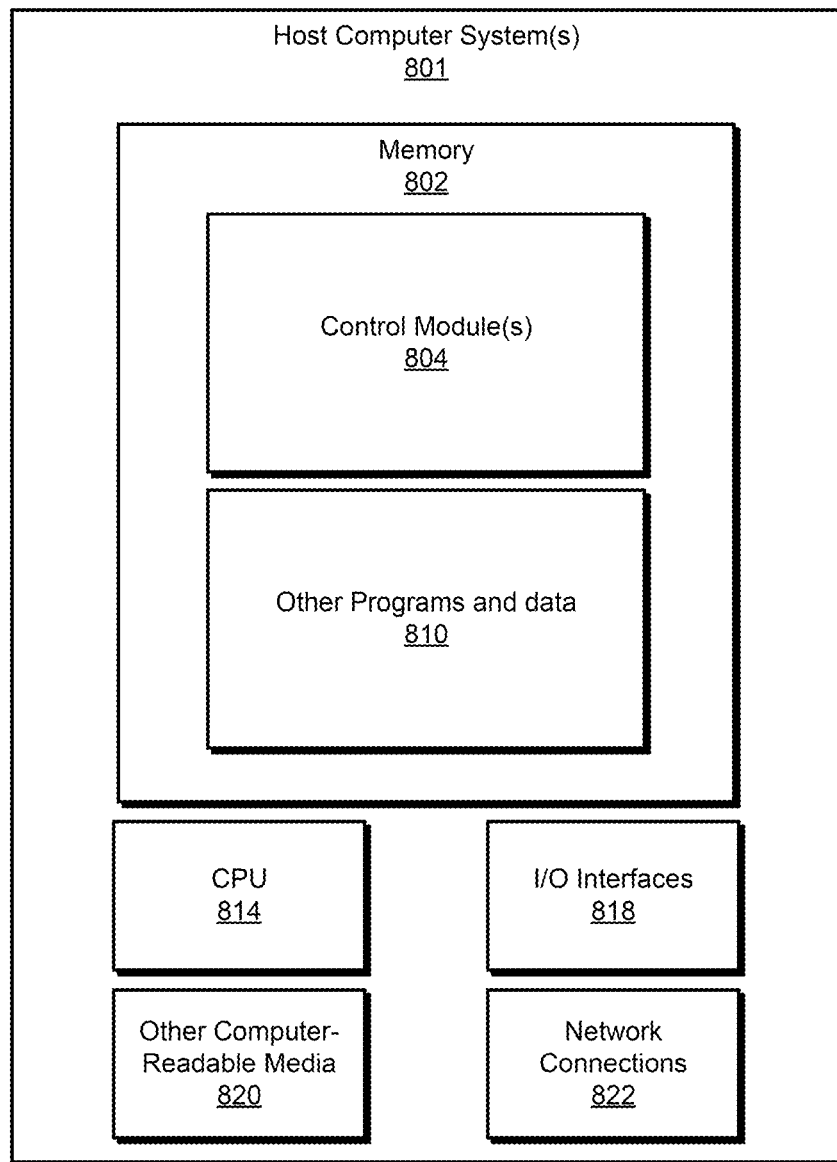
FIG. 8 shows an example computer system that may facilitate the performance of one or more of the methods described herein.

FIG. 8 shows a system diagram that describes an example implementation of a computing system(s) for implementing embodiments described herein. The functionality described herein for radio access network slicing can be implemented either on dedicated hardware, as a software instance running on dedicated hardware, or as a virtualized function instantiated on an appropriate platform, e.g., a cloud infrastructure. In some embodiments, such functionality may be completely software-based and designed as cloud-native, meaning that they are agnostic to the underlying cloud infrastructure, allowing higher deployment agility and flexibility. However, FIG. 8 illustrates an example of underlying hardware on which such software and functionality may be hosted and/or implemented.

In particular, shown is example host computer system(s) 801. For example, such computer system(s) 801 may execute a scripting application, or other software application, to perform method 100, as further discussed above, and/or to perform one or more of the other methods described herein. In some embodiments, one or more special-purpose computing systems may be used to implement the functionality described herein. Accordingly, various embodiments described herein may be implemented in software, hardware, firmware, or in some combination thereof. Host computer system(s) 801 may include memory 802, one or more central processing units (CPUs) 814, I/O interfaces 818, other computer-readable media 820, and network connections 822.

Memory 802 may include one or more various types of non-volatile and/or volatile storage technologies. Examples of memory 802 may include, but are not limited to, flash memory, hard disk drives, optical drives, solid-state drives, various types of random access memory (RAM), various types of read-only memory (ROM), neural networks, other computer-readable storage media (also referred to as processor-readable storage media), or the like, or any combination thereof. Memory 802 may be utilized to store information, including computer-readable instructions that are utilized by CPU 814 to perform actions, including those of embodiments described herein.

Memory 802 may have stored thereon control module(s) 804. The control module(s) 804 may be configured to implement and/or perform some or all of the functions of the systems or components described herein for radio access network slicing. Memory 802 may also store other programs and data 810, which may include rules, databases, application programming interfaces (APIs), software containers, nodes, pods, clusters, node groups, control planes, software defined data centers (SDDCs), microservices, virtualized environments, software platforms, cloud computing service software, network management software, network orchestrator software, network functions (NF), artificial intelligence (AI) or machine learning (ML) programs or models to perform the functionality described herein, user interfaces, operating systems, other network management functions, other NFs, etc.

Network connections 822 are configured to communicate with other computing devices to facilitate the functionality described herein. In various embodiments, the network connections 822 include transmitters and receivers (not illustrated), cellular telecommunication network equipment and interfaces, and/or other computer network equipment and interfaces to send and receive data as described herein, such as to send and receive instructions, commands and data to implement the processes described herein. I/O interfaces 818 may include a video interface, other data input or output interfaces, or the like. Other computer-readable media 820 may include other types of stationary or removable computer-readable media, such as removable flash drives, external hard drives, or the like.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method comprising:
   generating, at a first time, a first bitmap where each bit of the first bitmap indicates a pass or fail for a respective health check test in a series of health check tests testing a cellular service network;
   generating, at a second time, a second bitmap where each bit of the second bitmap indicates a pass or fail for a corresponding respective health check test in the same series of health check tests testing the cellular service network; and
   remediating a network problem indicated by detecting that a first result of a data integrity function executed on the first bitmap does not match a second result of the same data integrity function executed on the second bitmap, wherein:
      at least one of the series of health check tests indicates whether a system component is registered;
      at least one of the series of health check tests indicates whether a detected location of a component matches an expected location of the component; and
      at least one of the series of health check tests produces predominantly alphanumerical output.

2. The method of claim 1, wherein the cellular service network comprises a cellular service core network.

3. The method of claim 1, wherein at least one of the series of health check tests indicates whether a number of detected components matches a number of expected components.

4. The method of claim 1, wherein output from the series of health check tests is recorded within a data lake.

5. The method of claim 1, wherein the first bitmap indicates a higher pass rate than the second bitmap.

6. The method of claim 1, wherein the data integrity function indicates that a bit of at least one health check test has altered despite the first bitmap and the second bitmap indicating a same pass rate.

7. The method of claim 1, wherein at least one of the series of health check tests produces predominantly numerical output.

8. A system comprising:
   at least one physical processor; and
   a non-transitory computer-readable medium encoding instructions that, when executed by the at least one physical processor, cause operations to be performed comprising:
      generating, at a first time, a first bitmap where each bit of the first bitmap indicates a pass or fail for a respective health check test in a series of health check tests testing a cellular service network;
      generating, at a second time, a second bitmap where each bit of the second bitmap indicates a pass or fail for a corresponding respective health check test in the same series of health check tests testing the cellular service network; and
      remediating a network problem indicated by detecting that a first result of a data integrity function executed on the first bitmap does not match a second result of the same data integrity function executed on the second bitmap, wherein:
         at least one of the series of health check tests indicates whether a system component is registered;
         at least one of the series of health check tests indicates whether a detected location of a component matches an expected location of the component; and
         at least one of the series of health check tests produces predominantly alphanumerical output.

9. The system of claim 8, wherein the cellular service network comprises a cellular service core network.

10. The system of claim 8, wherein at least one of the series of health check tests indicates whether a number of detected components matches a number of expected components.

11. The system of claim 8, wherein output from the series of health check tests is recorded within a data lake.

12. The system of claim 8, wherein the first bitmap indicates a higher pass rate than the second bitmap.

13. The system of claim 8, wherein the data integrity function indicates that a bit of at least one health check test has altered despite the first bitmap and the second bitmap indicating a same pass rate.

14. The system of claim 8, wherein at least one of the series of health check tests indicates whether a detected location of a component matches an expected location of the component.

15. The system of claim 8, wherein at least one of the series of health check tests produces predominantly numerical output.

16. A non-transitory computer-readable medium encoding instructions that, when executed by at least one physical processor of a computing device, cause the computing device to perform a method comprising:
   generating, at a first time, a first bitmap where each bit of the first bitmap indicates a pass or fail for a respective health check test in a series of health check tests testing a cellular service network;
   generating, at a second time, a second bitmap where each bit of the second bitmap indicates a pass or fail for a corresponding respective health check test in the same series of health check tests testing the cellular service network; and
   remediating a network problem indicated by detecting that a first result of a data integrity function executed on the first bitmap does not match a second result of the same data integrity function executed on the second bitmap, wherein:
      at least one of the series of health check tests indicates whether a system component is registered;
      at least one of the series of health check tests indicates whether a detected location of a component matches an expected location of the component; and
      at least one of the series of health check tests produces predominantly alphanumerical output.

* * * * *